(12) United States Patent
Aida

(10) Patent No.: US 7,967,511 B2
(45) Date of Patent: Jun. 28, 2011

(54) ROTATION RING

(75) Inventor: Tomoyuki Aida, Tokyo (JP)

(73) Assignee: THK Co., Ltd., Tokyo (JP)

( * ) Notice: Subject to any disclaimer, the term of this patent is extended or adjusted under 35 U.S.C. 154(b) by 0 days.

(21) Appl. No.: 12/677,406

(22) PCT Filed: Sep. 16, 2008

(86) PCT No.: PCT/JP2008/066666
§ 371 (c)(1),
(2), (4) Date: Mar. 10, 2010

(87) PCT Pub. No.: WO2009/041311
PCT Pub. Date: Apr. 2, 2009

(65) Prior Publication Data
US 2010/0284641 A1  Nov. 11, 2010

(30) Foreign Application Priority Data
Sep. 28, 2007  (JP) ................................ 2007-253257

(51) Int. Cl.
*F16C 29/06* (2006.01)
(52) U.S. Cl. .......................................... 384/451; 384/45
(58) Field of Classification Search .................. 384/451, 384/45; 108/20–22
See application file for complete search history.

(56) References Cited

U.S. PATENT DOCUMENTS

| | | | |
|---|---|---|---|
| 3,795,429 A * | 3/1974 | Peyrot | 384/451 |
| 4,557,532 A | 12/1985 | Teramachi | |
| 4,586,758 A | 5/1986 | Teramachi | |
| 5,411,334 A * | 5/1995 | Takei et al. | 384/45 |
| 5,575,565 A * | 11/1996 | Takei et al. | 384/45 |
| 6,547,437 B2 * | 4/2003 | Kamimura et al. | 384/45 |
| 7,798,071 B2 * | 9/2010 | Ishikawa et al. | 108/20 |

FOREIGN PATENT DOCUMENTS

| | | |
|---|---|---|
| DE | 10327641 A1 | 1/2005 |
| JP | 59-208218 A | 11/1984 |
| JP | 60-196428 A | 10/1985 |
| JP | 62-101914 A | 5/1987 |
| JP | 5-8037 U | 2/1993 |
| JP | 2001-099152 A | 4/2001 |
| JP | 2005-61574 A | 3/2005 |
| JP | 2006-022851 A | 1/2006 |
| JP | 2007-107411 A | 4/2007 |
| WO | 2006-129351 A1 | 12/2006 |

OTHER PUBLICATIONS

International Search Report of PCT/JP2008/066666, mailing date of Oct. 21, 2008.

* cited by examiner

*Primary Examiner* — Thomas R Hannon
(74) *Attorney, Agent, or Firm* — Westerman, Hattori, Daniels & Adrian, LLP

(57) ABSTRACT

Provided is a slewing ring which has a structure with a large slewing diameter, and is readily produced at low cost. The slewing ring includes: an outer ring (1), in which a load rolling groove (10) and a no-load rolling groove (11) for a large number of balls (4) are arranged along a circumferential direction of an inner peripheral surface of the outer ring (1) in parallel to each other; an inner ring (2), which is provided inside the outer ring (1), and in which a load rolling groove (20) and a no-load rolling groove (21) for the large number of balls (4) are arranged along a circumferential direction of an outer peripheral surface of the inner ring (2) in parallel to each other; and a plurality of ball-retaining blocks (3), which are provided in a gap between the outer ring and the inner ring, are assembled between the outer ring and the inner ring through the large number of balls, and causes the large number of balls (4) to circulate in an endless manner between the load rolling groove (10) of the outer ring (1) and the no-load rolling groove (21) of the inner ring (2) and between the no-load rolling groove (11) of the outer ring (1) and the load rolling groove (20) of the inner ring (2).

4 Claims, 3 Drawing Sheets

ROTATION RING

TECHNICAL FIELD

The present invention relates to a slewing ring for bearing slewing motion of a movable structure with respect to an immobile structure.

BACKGROUND ART

For example, in a wind turbine generator, a wind turbine and a nacelle are installed in an upper part of a tower, the nacelle housing an electricity generator rotationally driven by the wind turbine. The nacelle is structured so as to perform yaw-slewing (slew on a substantially horizontal plane) with respect to the tower in accordance with a direction of the wind so that the wind turbine receives wind power from the front thereof.

Further, as the structure of causing the nacelle to perform yaw-slewing with respect to the tower, there has been used a slewing bearing, which is formed by combining an inner ring with an outer ring through a plurality of balls or rollers. One of the inner ring and the outer ring is fixed to the tower, and the other is fixed to the nacelle (JP2007-107411 A).

Meanwhile, also in a construction machine such as a power shovel and a crane, there is slewably installed an upper frame with respect to a track frame serving as a lower structure, the upper frame being provided with an operating seat and a counter weight. The slewing bearing has been used as such a slewing structure (JP2005-61574 A).

The slewing bearing includes an outer ring, an inner ring, and a plurality of rotors. The outer ring includes a rolling surface of rolling elements, which is formed along an inner peripheral surface. The inner ring includes a rolling surface formed in an outer peripheral surface, the rolling surface is opposed to the rolling surface on a side of the outer ring. The plurality of rolling elements roll between the outer ring and the inner ring while receiving load. It is possible to use balls or rollers as the rolling elements. In a case of using not the balls but the rollers, it is necessary to arrange the rollers in a cross-roller structure with respect to a rolling surface or to provide rolling surfaces in a plurality of rows and cause the rollers to tilt in different directions in the rolling surfaces, respectively, in such manner that the inner ring and the outer ring are not separated due to load.

Patent Document 1: JP2007-107411 A
Patent Document 2: JP2005-61574 A

DISCLOSURE OF THE INVENTION

Problems to be Solved by the Invention

In recent years, the wind turbine generator has been increased more and more in size in order to increase its rated power. Correspondingly to the increase in size, the wind turbine tends to be increased in diameter, and the nacelle tends to be increased in size. Therefore, the slewing bearing to be used in the slewing structure is significantly increased in size. Further, there arises a case where a giant slewing bearing having a diameter of 4 m or more is needed.

However, special facilities are needed for producing the inner ring and the outer ring of such giant slewing bearing. Further, a steel material having a large diameter, which is suitable for production, must be prepared. Therefore, there is a problem in that production cost is increased. In addition, as a product is increased in size, it is more difficult to obtain the steel material. Further, a rate of raw material cost in the production cost is increased. Therefore, also with this regard, the production cost is increased. Additionally, in recent years, the natural energy by the wind power generation and the like is focused in terms of the global warming problem, and demand for the wind turbine generator tends to be increased. However, it is impossible to mass-produce the above-mentioned slewing bearing having the large diameter for a short period. Thus, there is a problem in that supply cannot catch up with the demand.

Means for Solving the Problems

The present invention has been made in view of the above-mentioned problems, and it is an object of the present invention to provide a slewing ring which has a structure with a large slewing diameter, and is readily produced at low cost.

That is, according to the present invention, there is provided a slewing ring, including: an outer ring, in which a load rolling groove and a no-load rolling groove for a large number of balls are arranged along a circumferential direction of an inner peripheral surface of the outer ring in parallel to each other; an inner ring, which is provided inside the outer ring, and in which a load rolling groove and a no-load rolling groove for the large number of balls are arranged along a circumferential direction of an outer peripheral surface of the inner ring in parallel to each other; and a plurality of ball-retaining blocks, which are provided in a gap between the outer ring and the inner ring, are provided between the outer ring and the inner ring through the large number of balls rolling in the load rolling grooves, and causes the large number of balls to circulate in an endless manner between the load rolling groove of the outer ring and the no-load rolling groove of the inner ring and between the no-load rolling groove of the outer ring and the load rolling groove of the inner ring.

EFFECTS OF THE INVENTION

The above-mentioned slewing ring according to the present invention includes the outer ring, the inner ring, and the ball-retaining blocks arranged therebetween. The ball-retaining blocks are assembled through a large number of balls to both of the outer ring and the inner ring, and are each provided with at least a pair of endless circulation passages. In one endless circulation passage, the balls roll while receiving load between the outer ring and the ball-retaining blocks before the balls roll in a no-load state between the inner ring and the ball-retaining blocks. Further, in the other endless circulation passage, the balls roll while receiving load between the inner ring and the ball-retaining blocks before the balls roll in a no-load state between the outer ring and the ball-retaining blocks. Therefore, it is possible to cause the ball-retaining blocks to freely move with respect to both of the outer ring and the inner ring along the circumferential direction thereof in a state in which load acts on the ball-retaining blocks.

The slewing ring according to the present invention includes the outer ring and the inner ring similarly to the conventional slewing bearing. In the slewing ring according to the present invention, the ball-retaining blocks are arranged between the outer ring and the inner ring, and hence an inner diameter of the inner ring in the present invention can be reduced in size in comparison with an inner diameter of the inner ring in the conventional slewing ring if an inner diameter of the outer ring is the same as an inner diameter of the outer ring in the conventional slewing ring. Therefore, it is possible to reduce the amount of steel material needed for producing the inner ring in comparison with the conventional slewing ring, and hence it is possible to reduce production cost.

As a use mode of the slewing ring according to the present invention, the slewing ring can be used in such a manner that the outer ring and the inner ring are fixed to the same structure while the ball-retaining blocks are fixed to a separate structure, and that the ball-retaining blocks are slewed with respect to the outer ring and the inner ring. Further, by fixing the inner block, the ball-retaining blocks, and the outer block to different structures, respectively, it is also possible to separately slew the ball-retaining blocks and the inner ring with respect to the outer ring.

BEST MODE FOR CARRYING OUT THE INVENTION

Hereinafter, slewing rings according to the present invention are described in detail with reference to the drawings.

Figure 1:
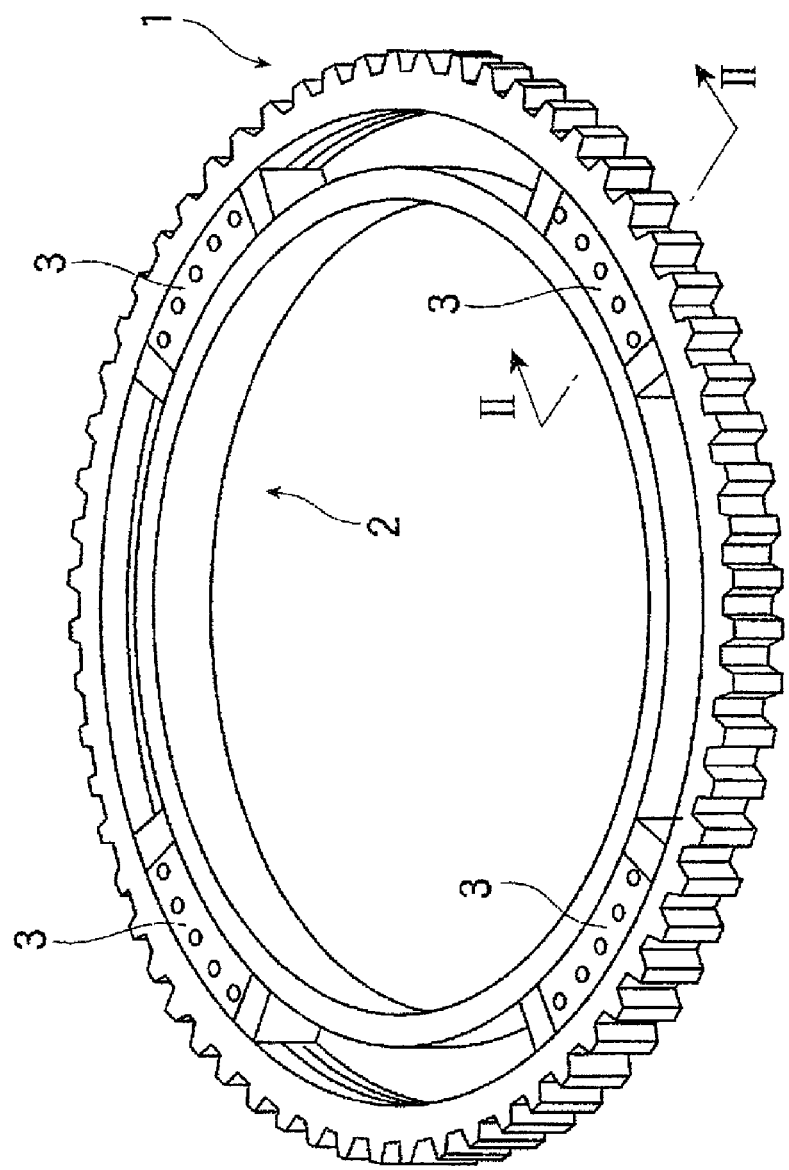
FIG. 1 A perspective view illustrating a first embodiment of a slewing ring according to the present invention.
Figure 2:
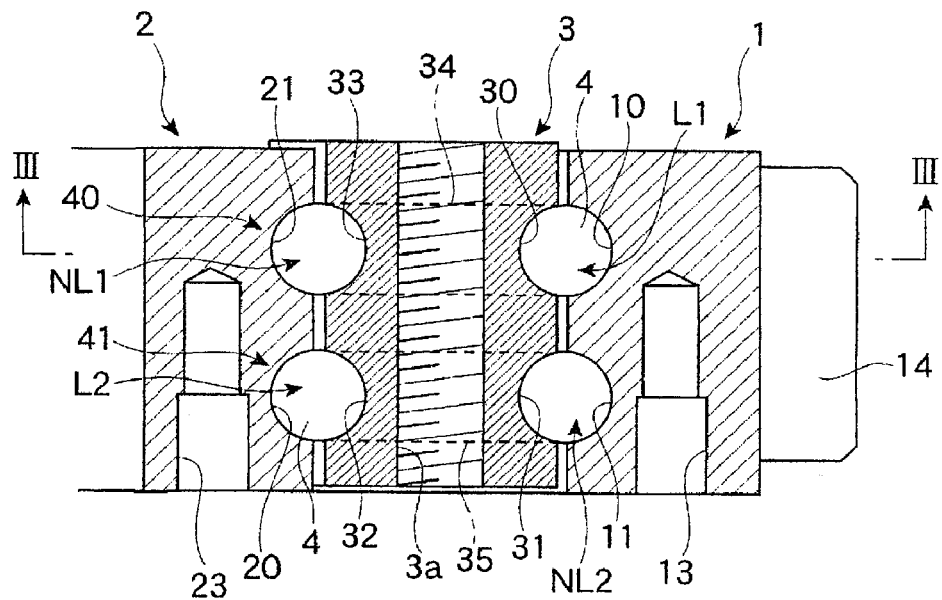
FIG. 2 A cross-sectional view taken along the line II-II of FIG. 1.

FIG. 1 and FIG. 2 illustrate a first embodiment of a slewing ring, to which the present invention is applied. FIG. 1 is a perspective view and FIG. 2 is a cross-sectional view taken along the line II-II of FIG. 1. The slewing ring includes an outer ring 1, an inner ring 2, and a plurality of ball-retaining blocks 3. The inner ring 2 is arranged inside the outer ring 1 so as to have an outer diameter smaller than an inner diameter of the outer ring 1. The plurality of ball-retaining blocks 3 are arranged through a plurality of balls 4 between the outer ring 1 and the inner ring 2. The plurality of ball-retaining blocks 3 are allowed to freely move with respect to both of the outer ring 1 and the inner ring 2 in circumferential directions thereof. That is, the outer ring 1 and the inner ring 2 are allowed to separately perform slewing motion with respect to the plurality of ball-retaining blocks 3.

In an inner peripheral surface of the outer ring 1, there are arranged a load rolling groove 10 and a no-load rolling groove 11 for the balls 4 so as to extend along the circumferential direction of the outer ring 1 in parallel to each other. The load rolling groove 10 is formed into a Gothic arch groove shape. Further, the load rolling groove 10 is structured by a combination of two arc-curved surfaces tilted by 45° with respect to a right and left direction on the sheet of FIG. 2. Each of the arc-curved surfaces is formed so as to have a radius of curvature slightly larger than that of a spherical surface of each of the balls, and the balls 4 roll in the load rolling groove 10 in a contact state with each of the arc-curved surfaces. Further, the no-load rolling groove 11 is formed of a single arc-curved surface slightly larger than the spherical surface of each of the balls, and a groove depth of the no-load rolling groove 11 is set to be slightly larger than that of the load rolling groove 10.

In an outer peripheral surface of the inner ring 2, there are arranged a load rolling groove 20 and a no-load rolling groove 21 for the balls 4 so as to extend along the circumferential direction of the inner ring 2 in parallel to each other. The load rolling groove 20 and the no-load rolling groove 21 have the same structures as those formed in the outer ring 1. In the embodiment illustrated in FIG. 2, the load rolling groove 20 of the inner ring 2 is arranged in a position opposed to the no-load rolling groove 11 of the outer ring 1 while sandwiching the ball-retaining blocks 3. Further, the no-load rolling groove 21 of the inner ring 2 is arranged in a position opposed to the load rolling groove 10 of the outer ring 1 while sandwiching the ball-retaining blocks 3.

Further, in the outer ring 1 and the inner ring 2, there are formed a plurality of tap holes 13 and 23 along the circumferential direction thereof. The tap holes 13 and 23 are used to fasten fixing bolts thereinto, which allows the outer ring 1 and the inner ring 2 to be fixed to a structure. Note that, in an example illustrated in FIG. 2, the tap hole 13 of the outer ring 1 and the tap hole 23 of the inner ring 2 are formed on the same side with respect to a rotational axis direction. That is because a case where the outer ring 1 and the inner ring 2 are fixed to the same structure is taken under consideration. In a case where the outer ring 1 and the inner ring 2 are fixed to separate structures, the tap hole 23 of the inner ring 2 may be formed in a surface on a side opposite to the inner ring 2, for example.

Meanwhile, the ball-retaining blocks 3 are arranged in a ring-like gap formed between the inner peripheral surface of the outer ring 1 and the outer peripheral surface of the inner ring 2. The ball-retaining blocks 3 have an arc shape as its entire so as to be received in the gap. Further, in the ball-retaining blocks 3, there are formed a plurality of tap holes 3a. The tap holes 3a are used to fasten fixing bolts thereinto, which allows the ball-retaining blocks 3 to be fixed to the structure.

In an outer surface, which is opposed to the outer ring 1, of each of the ball-retaining blocks 3, there is formed a load rolling groove 30 for the balls 4, the load rolling groove 30 being opposed to the load rolling groove 10 of the outer ring 1. The load rolling groove 30 is formed into a Gothic arch groove shape similarly to the load rolling groove 10 of the outer ring 1. The load rolling groove 30 of each of the ball-retaining blocks 3 and the load rolling groove 10 of the outer ring 1 are opposed to each other, and hence there is formed a load passage L1 in which the balls 4 roll while receiving load. Further, in the outer surface of each of the ball-retaining blocks 3, there is formed a no-load rolling groove 31 opposed to the no-load rolling groove 11 of the outer ring 1. The no-load rolling groove 31 is formed of a single arc-curved surface slightly larger than the spherical surface of each of the balls similarly to the no-load rolling groove 11 of the outer ring 1, and a groove depth of the no-load rolling groove 31 is set to be slightly larger than that of the load rolling groove 30. The no-load rolling groove 31 of each of the ball-retaining blocks 3 and the no-load rolling groove 11 of the outer ring 1 are opposed to each other, and hence there is formed a no-load passage NL2 in which the balls 4 roll in a no-load state. Note that, it is possible to appropriately change the groove shape of each of the above-mentioned load rolling grooves correspondingly to required load-bearing capacity and load direction.

Meanwhile, in an inner surface, which is opposed to the inner ring 2, of each of the ball-retaining blocks 3, there are formed a load rolling groove 32 and a no-load rolling groove 33 similarly to the load rolling groove 30 and the no-load rolling groove 31, which are formed in the outer surface of each of the ball-retaining blocks 3. Note that, positions, in which the load rolling groove 32 and the no-load rolling groove 33 are formed, are reverse to those in the outer surface, in this example. The load rolling groove 32 is opposed to the load rolling groove 20 of the inner ring 2, and hence there is formed a load passage L2 for the balls 4. Further, the no-load rolling groove 33 is opposed to the no-load rolling groove 21 of the inner ring 2, and hence there is formed a no-load passage NL1 for the balls 4.

Further, each of the ball-retaining blocks 3 includes a pair of direction-changing passages 34 and a pair of direction-changing passages 35. The pair of direction-changing passages 34 link the load passage L1, which is positioned in the outer surface of each of the ball-retaining blocks 3, and the no-load passage NL1, which is positioned in the inner surface of each of the ball-retaining blocks 3. The pair of direction-changing passages 35 link the load passage L2, which is positioned in the inner surface of each of the ball-retaining blocks 3, and the no-load passage NL2, which is positioned in the outer surface of each of the ball-retaining blocks 3. With this, around each of the ball-retaining blocks 3, there are formed two endless circulation passages 40 and 41 for the balls 4.

Figure 3:
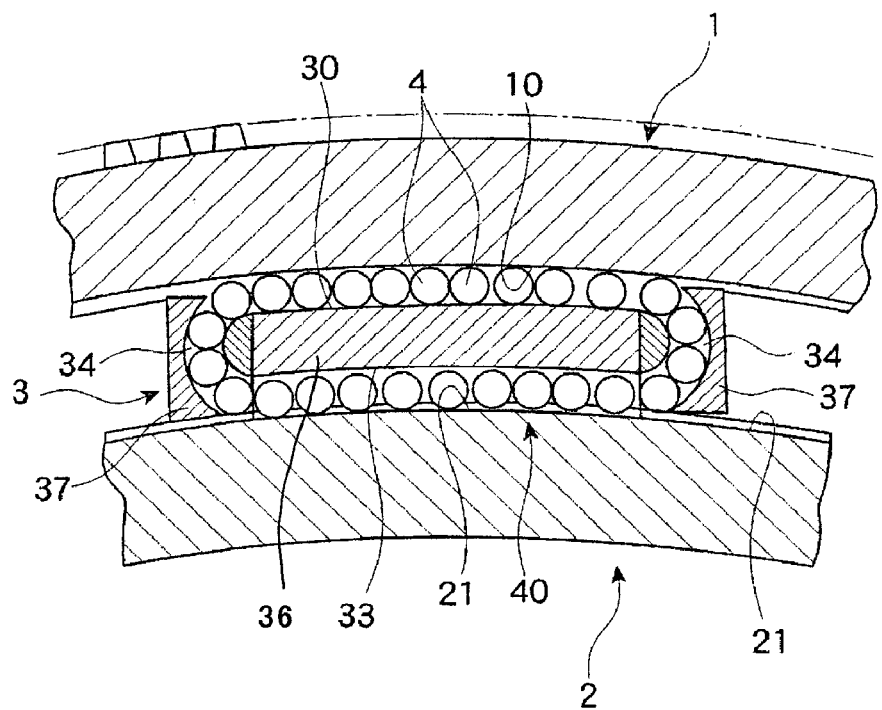
FIG. 3 A cross-sectional view taken along the line III-III of FIG. 2.

FIG. 3 is a cross-sectional view illustrating a structure of the endless circulation passage 40 (endless circulation passage positioned on an upper side in FIG. 2) for the balls 4 of the two endless circulation passage 40 provided to each of the ball-retaining blocks 3, the balls 4 receiving load between the outer ring 1 and the ball-retaining blocks 3. Each of the ball-retaining blocks 3 includes a block main body 36 and a pair of end plates 37. The pair of end plates 37 are positioned at both ends of the block main body 36. The load rolling groove 30 and the no-load rolling groove 33 described above are formed in the block main body 36 while the direction-changing passages 34 are formed in the end plates 37, respectively. Further, by fixing the end plates 37 to the both ends of the block main body 36, respectively, the load passage for the balls, which are formed between the outer ring and the block main body, and the no-load passage for the balls, which are formed between the inner ring and each of the ball-retaining blocks, are linked to each other by the direction-changing passages 34. In this way, the endless circulation passage for the balls is formed in each of the ball-retaining blocks. The endless circulation passage 41 (endless circulation passage positioned on a lower side in FIG. 2) for the balls 4 receiving load between the inner ring 2 is formed in the same manner as described above. In this case, a relation between the load passage and no-load passage is reverse to that illustrated in FIG. 3.

Further, in the slewing ring structured as described above, when the ball-retaining blocks 3 are caused to move in the circumferential direction of the outer ring 1, the balls 4 arranged in the endless circulation passage 40 circulate in the endless circulation passage 40 while receiving load between the load rolling groove 10 of the outer ring 1 and the load rolling groove 30 of each of the ball-retaining blocks 3. Thus, it is possible to move the ball-retaining blocks 3 in the circumferential direction of the outer ring 1. Further, when the ball-retaining blocks 3 are caused to move in the circumferential direction of the inner ring 2, the balls 4 arranged in the endless circulation passage 41 circulate in the endless circulation passage 41 while receiving load between the load rolling groove 20 of the inner ring 2 and the load rolling groove 32 of each of the ball-retaining blocks 3. Thus, it is possible to move the ball-retaining blocks 3 in the circumferential direction of the inner ring.

Therefore, for example, by fixing the outer ring 1 and the inner ring 2 to a first structure and fixing the ball-retaining blocks 3 to a second structure, it is possible to transmit slewing motion with respect to the first structure to the second structure.

Further, slewing motion of the outer ring 1 with respect to the ball-retaining blocks 3 is independent of slewing motion of the inner ring 2 with respect to the ball-retaining blocks 3. Therefore, in the slewing ring illustrated in FIGS. 1 to 3, it is also possible to provide separate slewing motions to the outer ring 1 and the inner ring 2. That is, by fixing the outer ring 1, the ball-retaining blocks 3, and the inner ring 2 to separate structures, it is possible to perform relative slewing motions among the three structures.

In the example illustrated in FIGS. 1 to 3, in the outer peripheral surface of the outer ring 1, there is formed a tooth row 14. By providing a gear mating with the tooth row 14 to the structure on the side of the ball-retaining blocks 3, it is possible to slew the above-mentioned structure with respect to the structure on the side of the outer ring 1. The above-mentioned tooth row may be provided in the inner peripheral surface of the inner ring 2, or may be provided in both of the outer peripheral surface of the outer ring 1 and the inner peripheral surface of the inner ring 2.

Further, it is possible to separate the outer ring 1 and the inner ring 2 along the circumferential direction thereof into a plurality of parts. That is, it is possible to constitute the outer ring 1 and the inner ring 2 by coupling a plurality of arc rails with each other. In a case where the outer ring 1 and the inner ring 2 are increased in size, it is more difficult to obtain steel material before manufacture of the slewing ring and it is more difficult to convey the slewing ring to a place where the slewing ring is to be used after manufacture. Therefore, the outer ring 1 and the inner ring 2 are manufactured by combining a plurality of arc rails with each other as described above, respectively, which allows reduction in production cost and conveying cost.

In addition, the number of the endless circulation passages for the balls 4 provided in each of the ball-retaining blocks 3 is not limited to two. It is possible to appropriately determine the number of the endless circulation passages for the balls 4 correspondingly to load, which acts between the outer ring 1 and the ball-retaining blocks 3 and between the inner ring 2 and the ball-retaining blocks 3. In this case, the number of the load rolling grooves and the no-load rolling grooves, which are formed in the outer ring 1 and the inner ring 2, is changed correspondingly to the number of the endless circulation passages.

Figure 4:
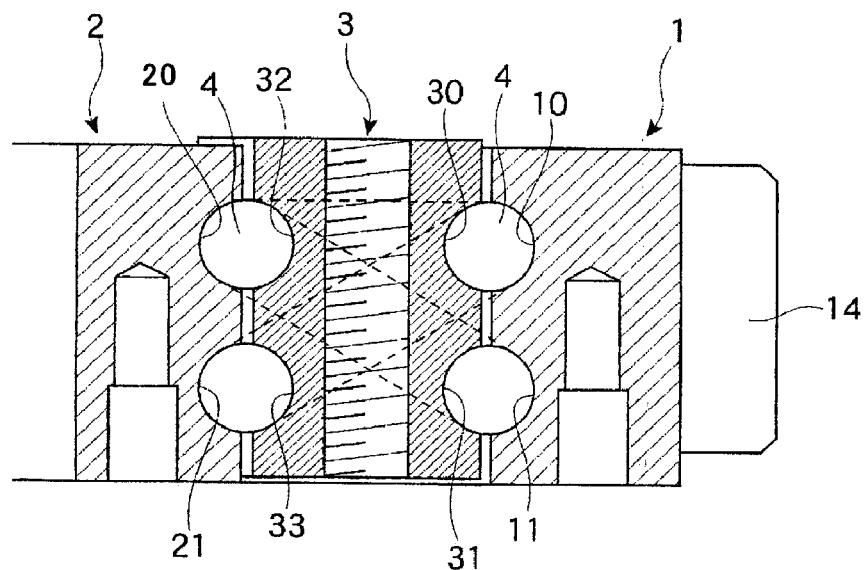
FIG. 4 A cross-sectional view illustrating a second embodiment of a slewing ring according to the present invention.

FIG. 4 illustrates a second embodiment of a slewing ring, to which the present invention is applied.

In the example illustrated in FIG. 2, the load rolling groove 10 of the outer ring 1 and the no-load rolling groove 21 of the inner ring 2 are opposed to each other while sandwiching the ball-retaining blocks 3. Thus, the load rolling groove and the no-load rolling groove constitute the same endless circulation passage. In an example illustrated in FIG. 4, a load rolling groove 10 of an outer ring 1 and a load rolling groove 20 of an inner ring 2 are opposed to each other while sandwiching the ball-retaining blocks 3, while a no-load rolling groove 11 of the outer ring 1 and a no-load rolling groove 21 of the inner ring 2 are opposed to each other while sandwiching the ball-retaining blocks 3. Therefore, the load rolling groove 10, which is positioned on an upper side of the outer ring, and the no-load rolling groove 21, which is positioned on a lower side of the inner ring, constitute the same endless circulation passage. Further, the no-load rolling groove 11, which is positioned on a lower side of the outer ring, and the load rolling groove 20, which is positioned on an upper side of the inner ring, constitute the same endless circulation passage.

When the load rolling groove 10 of the outer ring 1 and the load rolling groove 20 of the inner ring 2 are arranged so as to be opposed to each other as described above, it is possible to stabilize postures of the ball-retaining blocks 3 with respect to the outer ring 1 and the inner ring 2 in a case where axial load acts in an upper and lower direction on the sheet in FIG. 4 or in a case where radial load acts in a right and left direction on the sheet in FIG. 4. Thus, slewing motion of the ball-retaining blocks can be further smoothly performed with respect to the outer ring and the inner ring.

Figure 5:
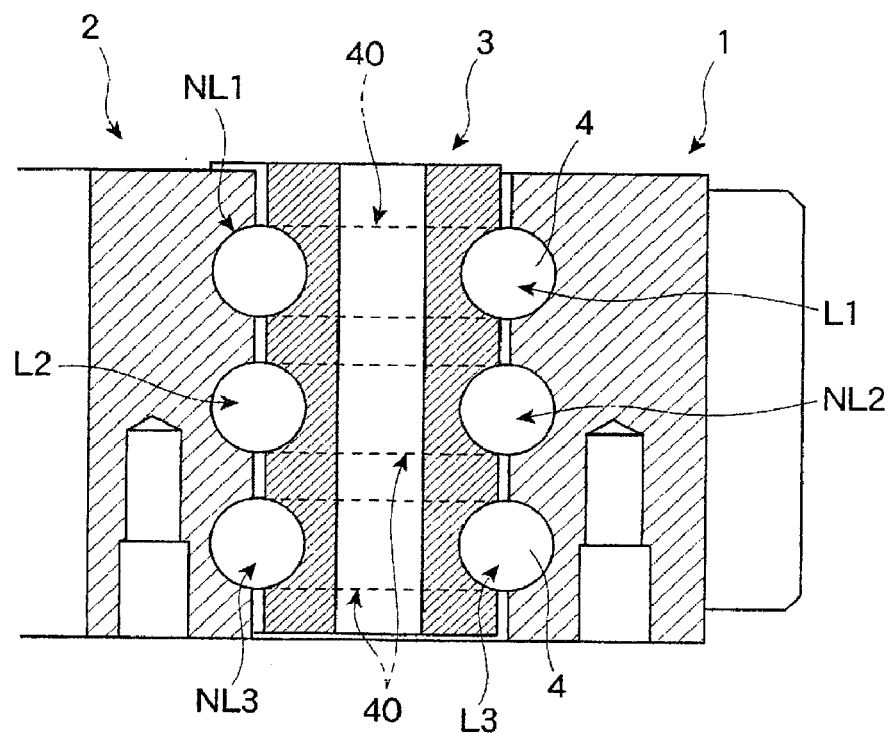
FIG. 5 A cross-sectional view illustrating a third embodiment of a slewing ring according to the present invention.

FIG. 5 illustrates a third embodiment of a slewing ring, to which the present invention is applied.

The slewing ring according to the third embodiment includes also an outer ring 1, an inner ring 2, and ball-retaining blocks 3. However, around each of the ball-retaining blocks 3, there are formed three endless circulation passages 40 for the balls 4. In the outer ring, there are formed two load rolling grooves 10 and a no-load rolling groove 11. Further, in the inner ring, there are formed a load rolling groove and two no-load rolling grooves.

With this, between each of the ball-retaining blocks 3 and the outer ring 1, there are formed a load passage L1, a no-load passage NL2, and a load passage L3 for the balls 4 in parallel to each other, while, between each of the ball-retaining blocks 3 and the inner ring 2, there are formed a no-load passage NL1, a load passage L2, and a no-load passage NL3 for the balls 4 in parallel to each other so as to be opposed to the load passage L1, the no-load passage NL2, and the load passage L3 for the balls 4, respectively. In the embodiment illustrated in FIG. 5, the load passages L1 and L3 are positioned on both upper and lower sides of the no-load passage NL2 in an outer surface of each of the ball-retaining blocks 3. Further, the no-load passages NL1 and NL3 are positioned on both upper and lower sides of the load passage L2 in an inner surface of each of the ball-retaining blocks 3. Therefore, there is obtained a property that the postures of the ball-retaining blocks 3 are easy to be stabilized with respect to the outer ring 1 and the inner ring 2.

As described above, in the slewing ring according to the present invention, it is possible to provide an arbitrary number of the endless circulation passages for the balls 4 around the ball-retaining blocks 3. Further, it is possible to arbitrarily select the number of the endless circulation passages correspondingly to required load-bearing capacity and load direction.

The invention claimed is:

1. A slewing ring, comprising:
    an outer ring (1), in which a load rolling groove (10) and a no-load rolling groove (11) for a large number of balls (4) are arranged along a circumferential direction of an inner peripheral surface of the outer ring (1) in parallel to each other;
    an inner ring (2), which is provided inside the outer ring, and in which a load rolling groove (20) and a no-load rolling groove (21) for the large number of balls (4) are arranged along a circumferential direction of an outer peripheral surface of the inner ring (2) in parallel to each other; and
    a plurality of ball-retaining blocks (3), which are provided in a gap between the outer ring (1) and the inner ring (2), are provided between the outer ring and the inner ring through the large number of balls rolling in the load rolling grooves, and causes the large number balls (4) to circulate in an endless manner between the load rolling groove (10) of the outer ring and the no-load rolling groove (21) of the inner ring and between the no-load rolling groove (11) of the outer ring and the load rolling groove (20) of the inner ring.

2. The slewing ring according to claim 1, wherein the load rolling groove (10) of the outer ring (1) and the load rolling groove (20) of the inner ring (2) are opposed to each other while sandwiching each of the plurality of ball-retaining blocks (3).

3. The slewing ring according to claim 1, wherein the outer ring (1) and the inner ring (2) are structured by combining a plurality of arc rails with each other.

4. The slewing ring according to claim 1, wherein a tooth row is provided in an outer peripheral surface of the outer ring (1) or an inner peripheral surface of the inner ring (2) along a circumferential direction thereof.

\* \* \* \* \*